US010940551B1

(12) United States Patent
Semnisky et al.

(10) Patent No.: US 10,940,551 B1
(45) Date of Patent: Mar. 9, 2021

(54) LIGHTWEIGHT CUTTING TOOL

(71) Applicant: Kennametal Inc., Latrobe, PA (US)

(72) Inventors: Logan M. Semnisky, Latrobe, PA (US); Alan J. Bookheimer, Greensburg, PA (US); Ruy Frota de Souza Filho, Latrobe, PA (US); Werner Penkert, Schwanstetten (DE); Ingo Grillenberger, Neuendettelsau (DE); Dominik Schmid, Fürth (DE)

(73) Assignee: KENNAMETAL INC., Latrobe, PA (US)

( * ) Notice: Subject to any disclaimer, the term of this patent is extended or adjusted under 35 U.S.C. 154(b) by 0 days.

(21) Appl. No.: 16/557,533

(22) Filed: Aug. 30, 2019

(51) Int. Cl.
*B23D 77/00* (2006.01)
*B23D 77/02* (2006.01)

(52) U.S. Cl.
CPC ........... *B23D 77/006* (2013.01); *B23D 77/02* (2013.01); *B23D 2277/46* (2013.01)

(58) Field of Classification Search
CPC ... B23D 77/006; B23D 77/02; B23D 2277/46
See application file for complete search history.

(56) References Cited

U.S. PATENT DOCUMENTS

| | | | | |
|---|---|---|---|---|
| 5,605,420 A | * | 2/1997 | Feldsine | B23C 5/006 407/32 |
| 5,934,842 A | * | 8/1999 | Gupta | B23C 5/006 407/120 |
| 6,120,218 A | * | 9/2000 | Bishop | B23C 5/006 407/34 |
| 6,655,883 B2 | | 12/2003 | Maar | |
| 8,950,985 B2 | * | 2/2015 | Durand-Terrasson | B23B 29/02 408/227 |

(Continued)

FOREIGN PATENT DOCUMENTS

| | | | |
|---|---|---|---|
| CN | 209139934 U | 7/2019 | |
| EP | 0074542 A2 * | 3/1983 | ......... B23B 31/1261 |

(Continued)

OTHER PUBLICATIONS

"Special Light Milling Head Produced by 3D Metal Printing", Regional Technological Institute, Faculty of Mechanical Engineering, University of West Bohemia, Univerzitni 8, 306, 14 Plzen, Czech Republic.

*Primary Examiner* — Eric A. Gates
(74) *Attorney, Agent, or Firm* — Larry R. Meenan

(57) ABSTRACT

A lightweight cutting tool, such as a reamer, includes a front cutting body, a front cutting ring, a center tube, a rear cutting ring and a rear machine connection member. An arm assembly of the front and rear cutting heads includes one or more leading arms, one or more trailing arms and a cutting head supported by the leading and trailing arms. The leading arms and the trailing arms curve in opposite directions. To reduce weight and moment of inertia of the reamer, a cross-sectional area of the leading arms and the trailing arms is largest proximate the sleeve member and is smallest proximate the cutting head. In addition, the front cutting body, the front and rear cutting rings and the center tube may be made by additive manufacturing. Fluid can be transported entirely through the reamer to the cutting insert/workpiece interface and the guide pad/workpiece interface.

29 Claims, 10 Drawing Sheets

(56) References Cited

U.S. PATENT DOCUMENTS

| | | |
|---|---|---|
| 9,283,624 B2 | 3/2016 | Freyermuth et al. |
| 2011/0182676 A1 | 7/2011 | Frank et al. |
| 2013/0156520 A1* | 6/2013 | Hacker .................. B23D 77/02 |
| | | 408/113 |
| 2014/0161543 A1* | 6/2014 | Francis ..................... B23C 5/06 |
| | | 407/11 |
| 2019/0099816 A1* | 4/2019 | Zetek ......................... B23C 5/06 |
| 2019/0314903 A1* | 10/2019 | Haenle ................... B23D 77/00 |

FOREIGN PATENT DOCUMENTS

| | | |
|---|---|---|
| EP | 1 984 135 B1 | 10/2008 |
| WO | 2010/020234 A1 | 8/2009 |

\* cited by examiner

LIGHTWEIGHT CUTTING TOOL

FIELD OF THE INVENTION

In general, the invention relates to cutting tools, and more particularly, to a lightweight cutting tool, such as a reamer, and the like, made of a composite material, including steel, carbon fiber, and the like, using additive manufacturing (i.e., 3D printing) to optimize the shape and distribution of material.

BACKGROUND OF THE INVENTION

When trying to use a reamer to finish a large hole, for example, the tool can become very heavy. Heavy tools are problematic for operators who have to handle the tools. In addition, the time to accelerate and decelerate the tool to its desired speed decreases with reduced tool weight and moment of inertia. Further, many machines with automatic tool changers also have weight limits for tools the machine can changed. Thus, there is a need to minimize the weight of large toolholders to allow for easier handling and reduced operating costs.

SUMMARY OF THE INVENTION

The problem of reducing the weight of a large cutting tool, such as a reamer, and the like, is solved by using additive manufacturing, along with composite materials, including, but not limited to, steel, carbon fiber, and the like, to allow the overall weight of the large cutting tool to be drastically reduced, while optimizing the shape and distribution of material and maintaining the strength, stiffness, and functionality of the cutting tool.

In one aspect, a cutting tool comprises a rear machine connection member; a center tube having a front end and a rear end. At least one cutting ring secured to the center tube and includes a sleeve member and one or more arm assemblies. Each arm assembly includes one or more leading arms extending radially outwardly from the sleeve member, one or more trailing arms extending radially outwardly from the sleeve member. The cutting head is supported by the one or more leading arms and the one or more trailing arms. A cross-sectional area of the one or more leading arms is largest proximate the sleeve member and is smallest proximate the cutting head to reduce weight and moment of inertia of the cutting tool, and a cross-sectional area of the one or more trailing arms is largest proximate the sleeve member and is smallest proximate the cutting head to reduce weight and moment of inertia of the cutting tool.

In another aspect, a cutting tool comprises a rear machine connection member; a center tube having a front end and a rear end. At least one cutting ring secured to the center tube and includes a sleeve member and one or more arm assemblies. Each arm assembly includes one or more leading arms extending radially outwardly from the sleeve member, one or more trailing arms extending radially outwardly from the sleeve member, and the cutting head supported by the one or more leading arms and the one or more trailing arms. The one or more leading arms extend radially outward from the sleeve member with a radius of curvature, $R_L$, and the one or more trailing arms extend radially outward from the sleeve member with a radius of curvature, $R_T$. The one or more leading arms curve in an opposite vertical and horizontal direction than the one or more trailing arms.

BRIEF DESCRIPTION OF THE DRAWINGS

While various embodiments of the invention are illustrated, the particular embodiments shown should not be construed to limit the claims. It is anticipated that various changes and modifications may be made without departing from the scope of this invention.

DETAILED DESCRIPTION OF THE INVENTION

Figure 1:
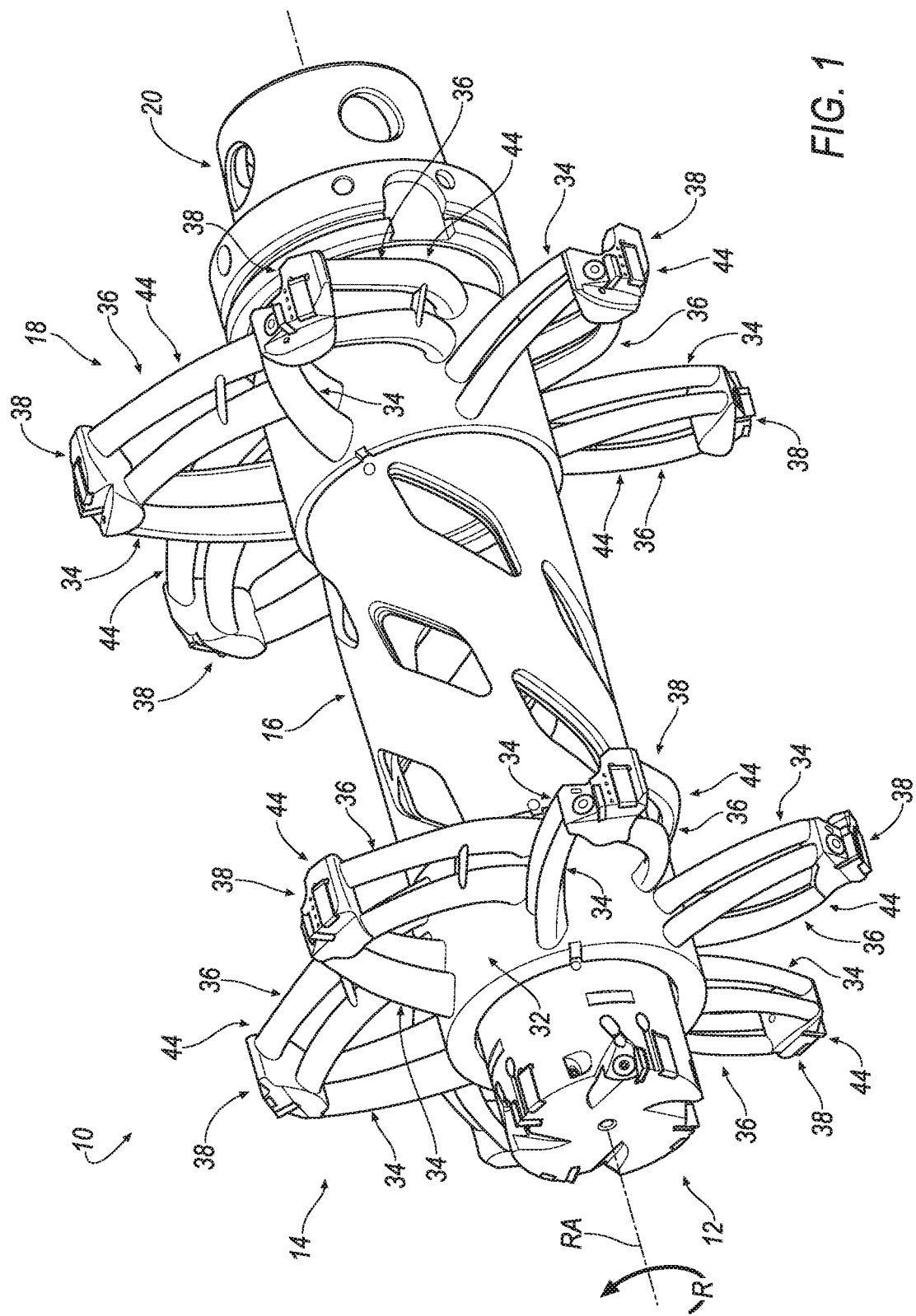
FIG. 1 is a front perspective view of a cutting tool, such as a lightweight reamer, according to an embodiment of the invention.
Figure 2:
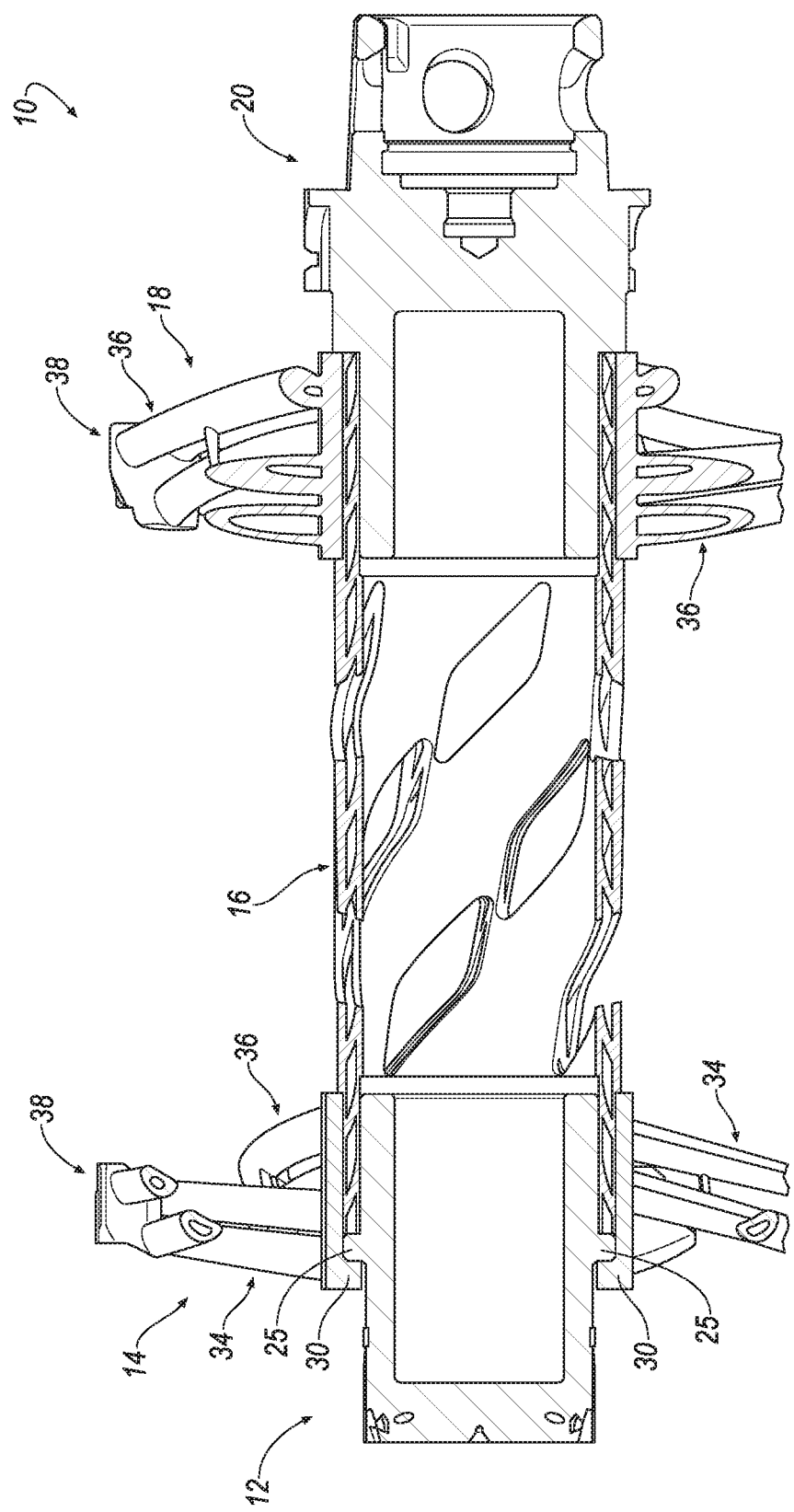
FIG. 2 is a cross-sectional view of the reamer of FIG. 1 taken along a central, rotational axis, RA, of the reamer.

Referring now to FIGS. 1 and 2, a cutting tool 10 is shown according to an embodiment of the invention. In the illustrated embodiment, the cutting tool comprises a reamer that rotates in the direction, R, about a central, rotational axis, RA, during operation. Although the large cutting tool 10 comprises a reamer in the illustrated embodiment, it should be appreciated that the principles of the invention can be applied to any large cutting tool for metal cutting operations, such as a milling cutter, and the like. In addition, the description herein of specific applications should not be a limitation on the scope and extent of the use of the cutting tool.

Directional phrases used herein, such as, for example, left, right, front, back, top, bottom and derivatives thereof, relate to the orientation of the elements shown in the drawings and are not limiting upon the claims unless expressly recited therein. Identical parts are provided with the same reference number in all drawings.

Approximating language, as used herein throughout the specification and claims, may be applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

Throughout the text and the claims, use of the word "about" in relation to a range of values (e.g., "about 22 to 35 wt %") is intended to modify both the high and low values recited, and reflects the penumbra of variation associated with measurement, significant figures, and interchangeability, all as understood by a person having ordinary skill in the art to which this invention pertains.

For purposes of this specification (other than in the operating examples), unless otherwise indicated, all numbers expressing quantities and ranges of ingredients, process conditions, etc., are to be understood as modified in all instances by the term "about". Accordingly, unless indicated to the contrary, the numerical parameters set forth in this specification and attached claims are approximations that can vary depending upon the desired results sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Further, as used in this specification and the appended claims, the singular forms "a", "an" and "the" are intended to include plural referents, unless expressly and unequivocally limited to one referent.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements including that found in the measuring instrument. Also, it should be understood that any numerical range recited herein is intended to include all sub-ranges subsumed therein. For example, a range of "1 to 10" is intended to include all sub-ranges between and including the recited minimum value of 1 and the recited maximum value of 10, i.e., a range having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

In the following specification and the claims, a number of terms are referenced that have the following meanings.

The singular forms "a", "an", and "the" include plural references unless the context clearly dictates otherwise.

"Optional" or "optionally" means that the subsequently described event or circumstance may or may not occur, and that the description includes instances where the event occurs and instances where it does not.

As used herein, the term "elongate" is defined as something that is longer than it is wide. In other words, the width is smaller than its length.

As used herein, the term "circular" is defined as an object having a shape of a circle, i.e., an object having a simple closed shape. It is the set of points in a plane that are at a given distance from a given point, the center; equivalently it is the curve traced out by a point that moves in a plane so that its distance from a given point is constant. The distance between any of the points and the center is called the radius.

As used herein, the term "fluid" is defined as a substance that has no fixed shape and yields easily to external pressure, such as a gas or a liquid.

As used herein, the term "3D printing" is any of various processes in which material is joined or solidified under computer control to create a three-dimensional object, with material being added together, such as liquid molecules or powder grains being fused together, typically layer by layer. In the 1990s, 3D printing techniques were considered suitable only to the production of functional or aesthetical prototypes and, back then, a more comprehensive term for 3D printing was rapid prototyping. Today, the precision, repeatability and material range have increased to the point that 3D printing is considered as an industrial production technology, with the official term of "additive manufacturing".

As used herein, the term "hole" is defined as an opening trough something; a gap; a cavity or an aperture that can have any cross-sectional shape.

As used herein, the term "large" is defined as a cutting tool having a cutting diameter of at least 150 mm.

Referring now to FIGS. 1 and 2, the lightweight reamer 10 has five basic components:
1) a front cutting body 12;
2) a front cutting ring 14;
3) a center tube 16;
4) a rear cutting ring 18; and
5) a rear machine connection member 20. The five basic components can be fastened to each other by using any well-known means in the art, such as shrink fitting, brazing, soldering, welding, glue, epoxy, and the like. Alternatively, all five basic components can be integrally formed using additive manufacturing (i.e., 3D printing).

Figure 3:
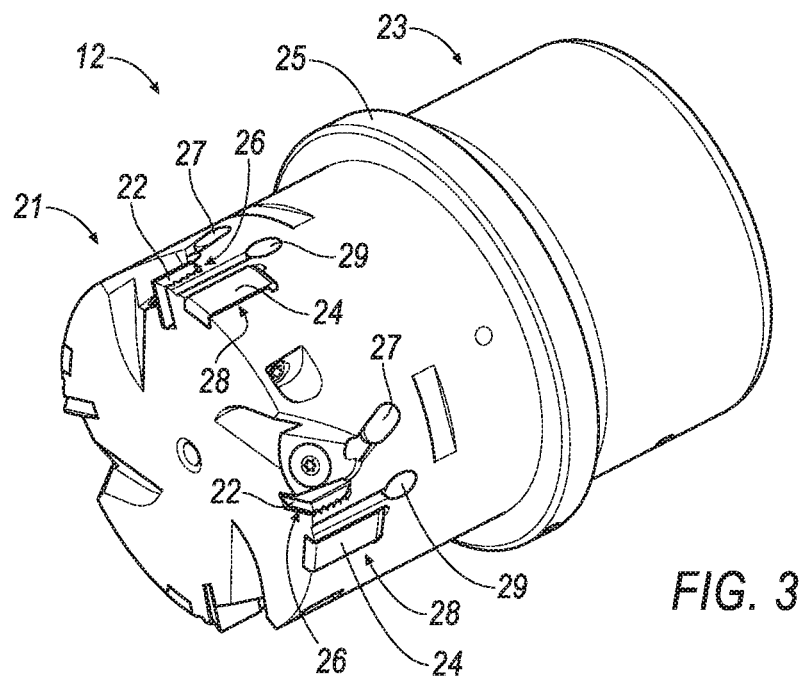
FIG. 3 is a front perspective view of a front cutting body of the reamer according to an embodiment of the invention.
Figure 4:
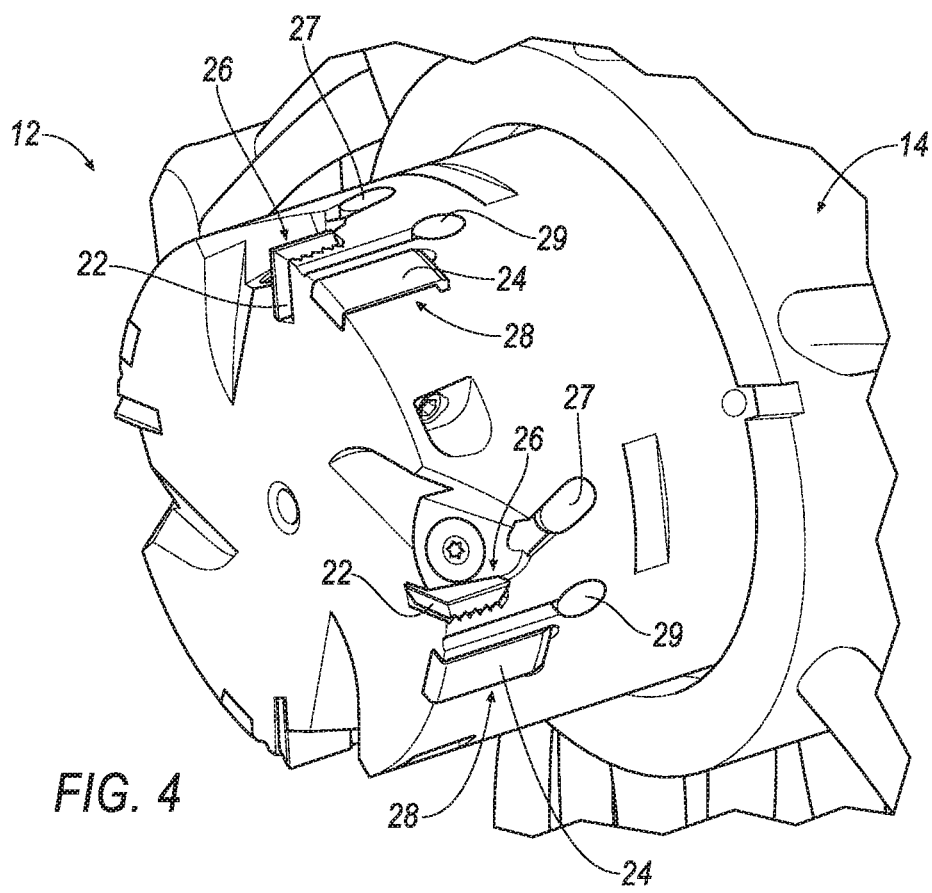
FIG. 4 is a partial, enlarged view of the front cutting body of FIG. 3 when attached to the reamer.

Referring now to FIGS. 3 and 4, the front cutting body 12 includes a front cutting portion 21 and a rear shank portion 23. The front cutting body 12 can be mounted to the center tube 16 by inserting the rear shank portion 23 into the center tube 16. However, the invention is not limited by the fastening method in which the front cutting body 12 is attached to the remainder of the reamer 10, and that the invention can be practiced using any suitable fastening method for attaching the front cutting body 12 to the remainder of the reamer 10. For example, the shank portion 23 of the front cutting body 12 can be omitted, and the flange 25 can attach directly attach the front cutting body 12 to be remainder of the reamer 10 by bolting, riveting, and the like. In another example, the front cutting body 12 can be made integral with the center tube 16.

In the illustrated embodiment, the front cutting portion 21 is separated from the rear shank portion 23 by a flange 25 that cooperates with a flange 30 on the front cutting ring 14 to attach the front cutting ring 14 to the front cutting body 12, as shown in FIGS. 2 and 3. The cutting head has a plurality of cutting inserts 22 mounted in a respective insert pocket 26 and a plurality of guide pads 24 mounted in a respective pad pocket 28. In the illustrated embodiment, the front cutting body 12 of the reamer 10 has a total of four cutting inserts 22 and four optional guide pads 24. However, it will be appreciated that the invention is not limited by the number of cutting inserts 22 and guide pads 24, and that the invention can be practiced with any desirable number of cutting inserts 22 and guide pads 24, such as two, three, five, six, seven, eight, nine, ten, eleven, twelve, and the like. In addition, the guide pads 24 are optional and can be eliminated. The front cutting body 12 also includes a port 27 for providing fluid to the cutting insert 22 and a port 29 for providing fluid to the guide pad 24.

Figure 5:
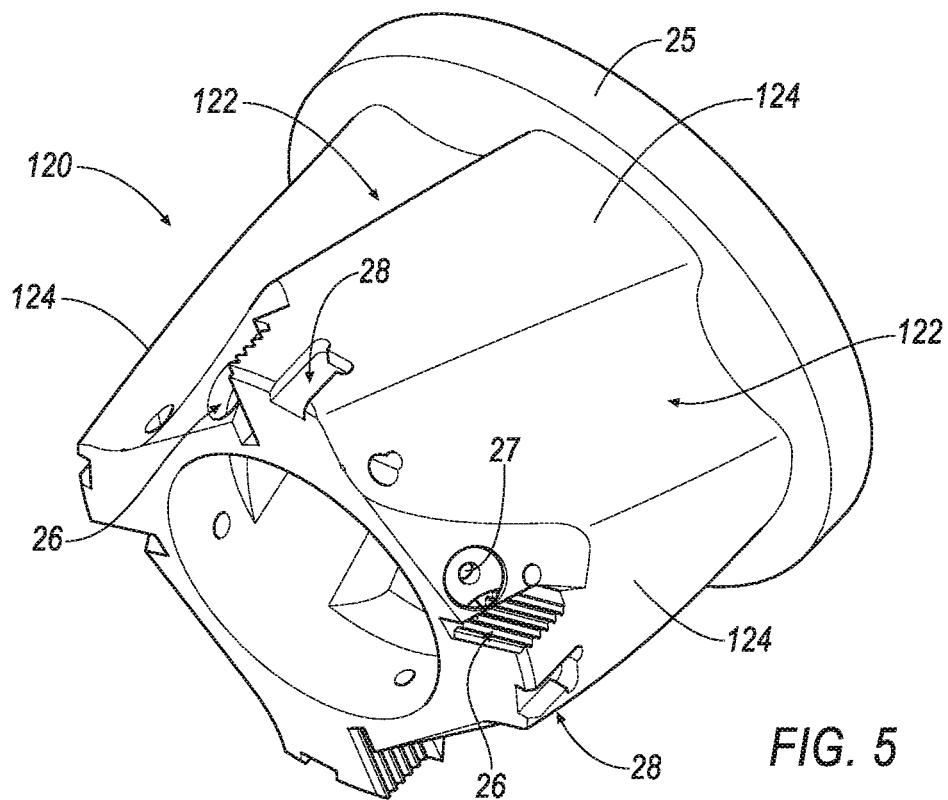
FIG. 5 is a front perspective view of a front cutting body of the reamer formed by additive manufacturing according to another embodiment of the invention.
Figure 6:
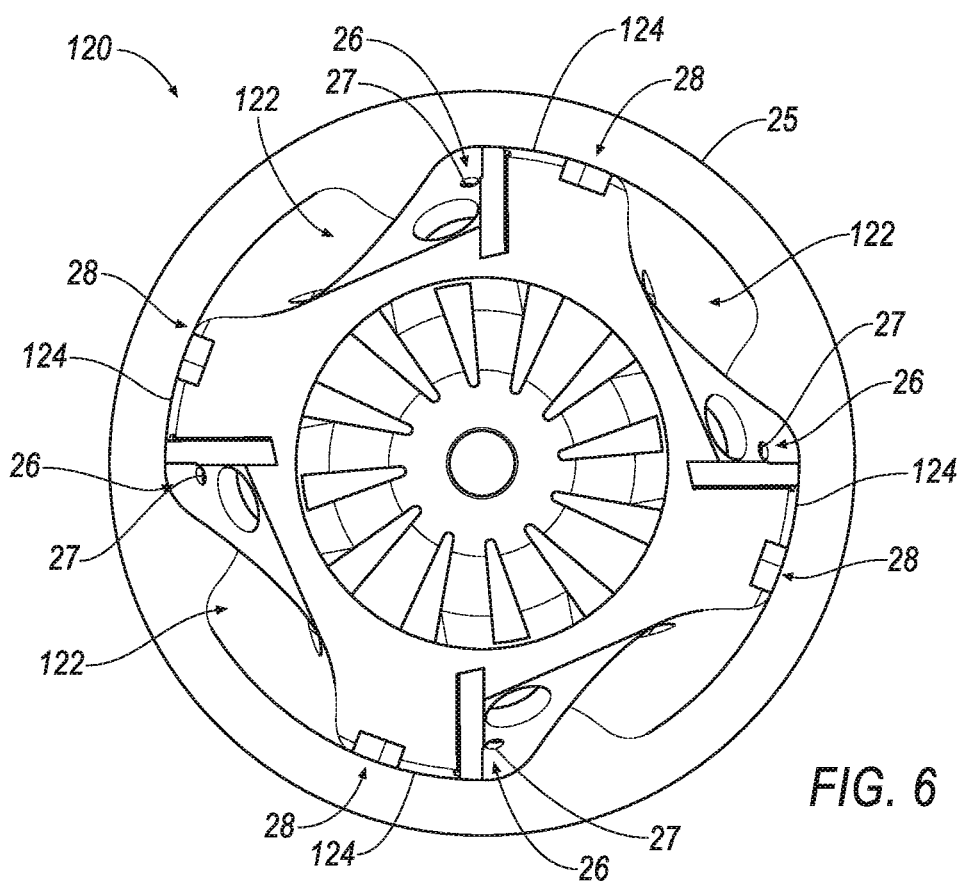
FIG. 6 is a front view of the front cutting body of FIG. 5.

The front cutting body 12 shown in FIGS. 3 and 4 can be made of tool steel using a conventional machining process. To further reduce the weight of the reamer 10, a front cutting body 120 can be made by additive manufacturing (i.e., 3D printing), as shown in FIGS. 5 and 6. In this embodiment, the front cutting body 120 is similar to the front cutting body 20, except that the front cutting body 120 does not have the rear shank portion 23, further reducing the weight of the front cutting body 120, as compared to the front cutting body 20. Further, the front cutting body 120 includes a plurality of chip grooves 122 separated by ribs 124 to assist in the evacuation of chips generated during a cutting operation.

It will be appreciated that the invention is not limited by the configuration of front cutting body 12, 120, and that the invention can be practiced with any desirable configuration that enables the reamer 10 to machine any desirable material. For example, the invention can be practiced with a front cutting body that includes a plurality of blades separated by flutes (not shown), instead of the cutting inserts 22 and the guide pads 24.

Figure 7:
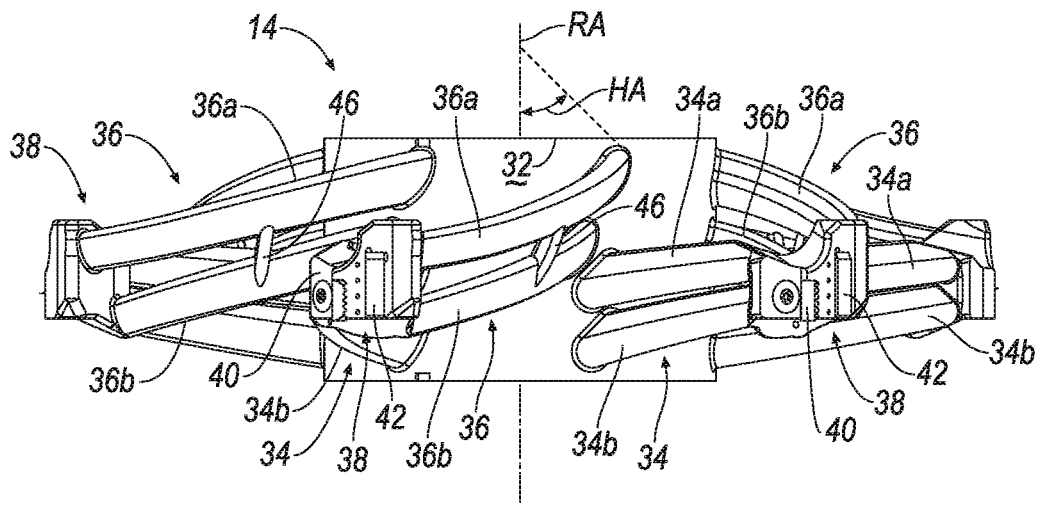
FIG. 7 is a side view of a front cutting ring of the reamer according to an embodiment of the invention, the rear cutting ring being substantially identical to the front cutting ring, except that the front cutting ring has a flange and the rear cutting ring may have a slightly larger cutting diameter.
Figure 8:
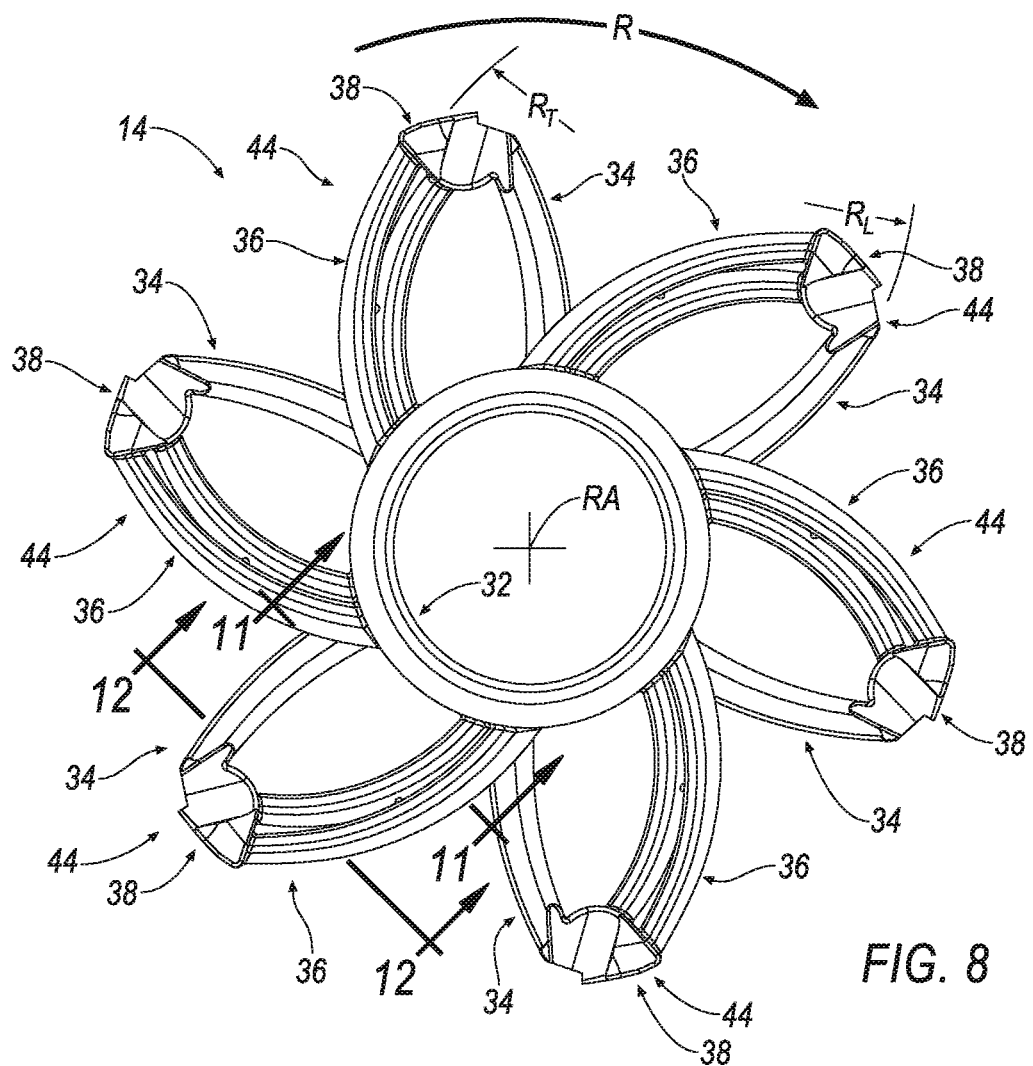
FIG. 8 is a top view of the front cutting ring of FIG. 7.

Referring now to FIGS. 7 and 8, the front cutting ring 14 is shown according to an embodiment of the invention. It should be noted that the front cutting ring 14 is substantially identical to the rear cutting ring 18, except that the rear cutting ring 18 does not include the flange 30 and that the rear cutting ring 18 may have a larger cutting diameter. Therefore, only the front cutting ring 14 will be described herein for brevity. Thus, it will be appreciated that any description herein for the front cutting ring 14 also applies to the rear cutting ring 18. It should also be noted that the invention is not limited by the number of cutting rings, and that the invention can be practiced with only a single cutting ring, or more than two cutting rings.

In general, the front cutting ring 14 includes a sleeve member 32, one or more leading arms 34 extending radially outwardly from the sleeve member 32, and one or more trailing arms 36 extending radially outwardly from the sleeve member 32. In the illustrated embodiment, the front cutting ring 14 has an upper leading arm 34a, a lower leading arm 34b, an upper trailing arm 36a and a lower trailing arm 36b. Thus, the illustrated embodiment has a total of two leading arms 34a, 34b and a total of two trailing arms 36a, 36b.

In the illustrated embodiment, the flange 30 of the sleeve member 32 cooperates with the flange 25 of the front cutting member 12 to secure the front cutting ring 14 to the front cutting body 12. However, it will be appreciated that the front cutting body 12 can be eliminated, and that the front cutting ring 14 is secured to the center tube 16, similar to the rear cutting ring 18, as shown in FIG. 2.

As shown in FIGS. 7 and 8, each leading arm 34a, 34b does not extend in a radial direction from the sleeve member 32 in a linear fashion, but in a curved fashion with a radius of curvature, $R_L$. Similarly, each trailing arm 36a, 36b extends in a curved fashion from the sleeve member 32 with a radius of curvature, $R_T$. The radius of curvature, $R_L$, can be same or different in magnitude than the radius of curvature, $R_T$. In addition, each leading arm 34a, 34b is curved in an opposite direction with respect to each trailing arm 36a, 36b. Specifically, the trailing arms 36 curve in the same direction as the direction of rotation, R, (indicated by the arrow) of the reamer 10, and the leading arms 34 curve in the opposite direction as the direction of rotation, R, of the reamer 10.

In addition, each leading arm 34a, 34b and each trailing arm 36a, 36b sweep along a helical arc defining a helix angle, HA, with respect to the central, rotational axis, RA, as shown in FIG. 7. The helix angle, HA, can be constant or variable. The helix angle, HA, can be in a range between about 0 degrees and about 60 degrees. For example, the helix angle, HA, can be about 35 degrees.

It should be noted that the helix angle, HA, of the leading arms 34 may be the same magnitude or a different magnitude than the helix angle, HA, of the trailing arms 36. For example, the leading arms 34 may have a smaller helix angle, HA, than the trailing arms 36. Also, it should be noted that the trailing arms 36 spiral in an opposite direction than the leading arms 34, as shown in FIG. 7. Thus, both the leading arms 34 and the trailing arms 36 curve in opposite directions with respect to both the horizontal axis (i.e., X-direction or Y-direction) and the vertical axis (i.e., Z-direction). The lower leading arm 34b is connected to the sleeve member 32 below the cutting head 38. Oppositely, the upper trailing arm 36a is connected to the sleeve member 32 above the cutting head 38, as shown in FIG. 7. Thus, the leading arms 34 curve in an opposite, vertical and horizontal direction as the trailing arms 36.

Each of the leading arms 34 and each of the trailing arms 36 can be supported by at least one support member 46 spanning between each leading arm 34a, 34b and each trailing arm 36a, 36b. The support member 46 helps maintain the spatial relationship between each leading arm 34a, 34b and each trailing arm 36a, 36b. In addition, the support member 46 increases the axial and tangential stiffness of the arm assembly 44. In the illustrated embodiment, the support member 46 is located approximately halfway between the sleeve member 32 and the cutting head 38. However, it will be appreciated that the support member 46 can be located at any appropriate location that suitably maintains the spatial relationship between the arms 34, 36.

As shown in FIGS. 7 and 8, the one or more leading arms 34, the one or more trailing arms 36, and the cutting head 38 comprise an arm assembly 44. In the illustrated embodiment, the reamer 10 has a total of six arm assemblies 44 spaced apart from each other about the perimeter of the sleeve member 32. In the illustrated embodiment, the arm assemblies 44 are generally equally spaced about the perimeter of the sleeve member 32. However, it should be appreciated that the arm assemblies 44 can be unequally spaced about the perimeter of the sleeve member 32. In addition, the invention is not limited by the number of arm assemblies 44, and that the invention can be practiced with any desirable number of arm assemblies 44, for example, two, three, four, five, seven, eight, nine, ten, eleven, twelve, and the like.

The front cutting ring 14 can be made of steel material, such as tool steel, using an additive manufacturing (i.e., 3D printing) process. In one embodiment, the front cutting ring 14 is made of a unitary construction in which the sleeve member 32 and the plurality of arm assemblies 44 are integrally formed with each other. In an alternative embodiment, the front cutting ring 14 comprises a plurality of arm assemblies 44, wherein each arm assembly 44 is separately attached to the sleeve member 32. It should be appreciated that the invention is not limited to the number of arm assemblies 44 that are separately attached to the sleeve member 32, and that the invention can be practiced with any desirable number of separate arm assemblies 44 attached to the sleeve member 32, such as two, three, four, five, six, seven, eight, and the like.

Figure 9:
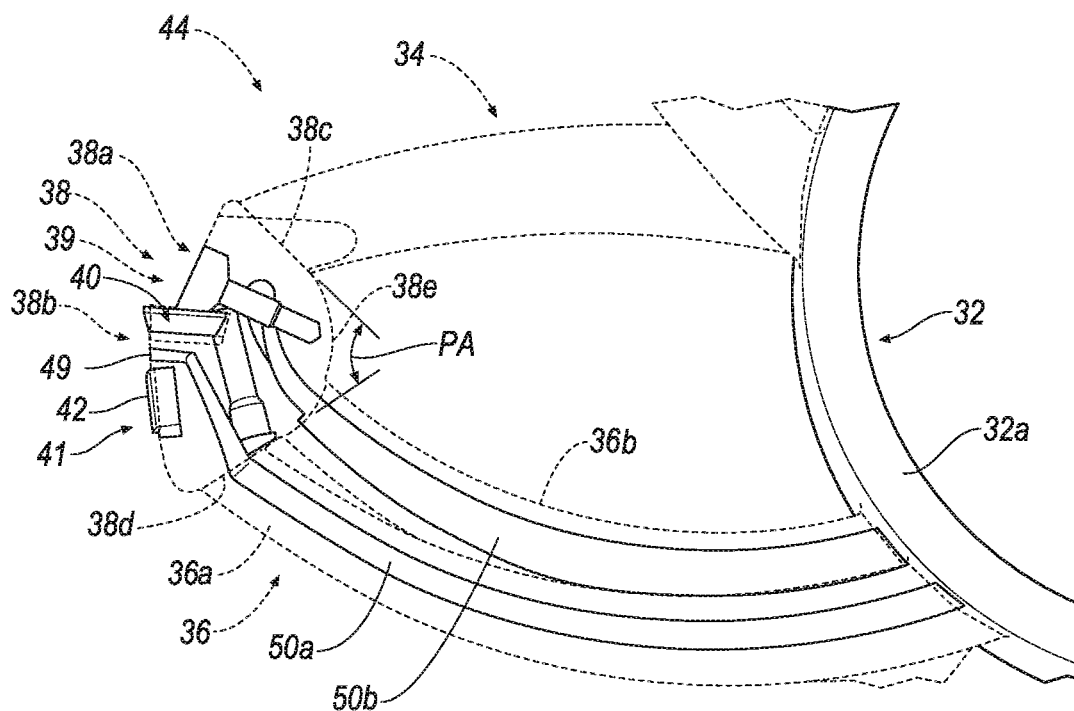
FIG. 9 is a partial, enlarged top view of an arm assembly of the reamer, the arm assembly comprising upper and lower leading arms, upper and lower trailing arms, and a cutting head according to an embodiment of the invention.
Figure 10:
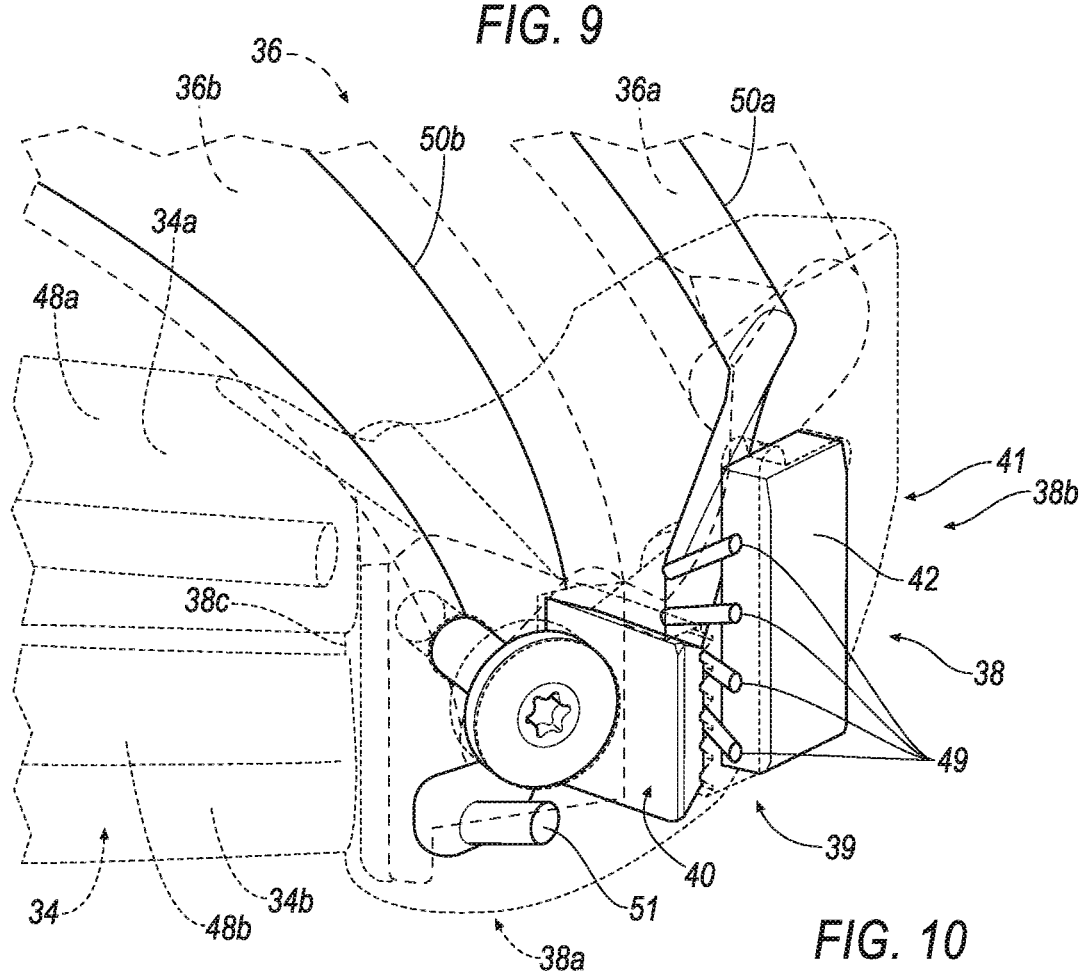
FIG. 10 is a partial, enlarged perspective view of the arm assembly of FIG. 9 showing fluid transported to the cutting insert/workpiece interface and the guide pad/workpiece interface by both trailing arms according to an embodiment of the invention.

Referring now to FIGS. 9 and 10, the front cutting ring 14 further includes a cutting head 38 with an insert pocket 39 for mounting a cutting insert 40 therein, and a guide pad pocket 41 for mounting a guide pad 42 therein. The cutting head 38 also includes a planar outer wall 38a adjacent the insert pocket 39, a curved, outer wall 38b adjacent the guide pad pocket 41, a first, planar inner wall 38c, a second planar inner wall 38d and an arcuate central portion 38e between the first and second inner walls 38c, 38d. The first, planar inner wall 38c is formed at an angle, PA, with respect to the second, planar inner wall 38d to enable the cutting head 38 to be supported by both leading arms 34a, 34b and both trailing arms 36a, 36b. Specifically, both leading arms 34a, 34b are operably connected to first, planar inner wall 38c adjacent the insert pocket 39 and the cutting insert 40, and both trailing arms 36a, 36b are operably connected to the second, planar inner wall 38d adjacent the guide pad pocket 41 and the guide pad 42.

As shown in FIGS. 9 and 10, each leading arm 34a, 34b and each trailing arm 36a, 36b has a hollow interior portion extending the entire length of each arm 34a, 34b, 36a, 36b to help reduce the weight of the reamer 10. The hollow interior portions of the arms 34, 36 enable fluid to be transported from the sleeve member 32 to the cutting insert/workpiece interface and the guide pad/workpiece interface. Specifically, the hollow interior portion of the leading arm 34a defines a fluid channel 48a, the hollow interior portion of the leading arm 34b defines a fluid channel 48b, the hollow interior portion of the trailing arm 36a defines a fluid channel 50a, and the hollow interior portion of the trailing arm 36b defines a fluid channel 50b. It should be noted that all the fluid channel 48a, 48b, 50a, 50b of both the front cutting ring 14 and the rear cutting ring 18 are capable of transporting fluid therein, and that the invention can be practiced with any number of fluid channels 48a, 48b, 50a, 50b transporting fluid in both the front cutting ring 14 and the rear cutting head 18. In one embodiment, for example, the fluid channel 48a in the upper leading arm 34a and the fluid channel 50a in the upper trailing arm 36a can be used for transporting fluid in the front cutting ring 14, while the fluid channels 50a, 50b in only the trailing arms 36a, 36b can be used for transporting fluid in the rear cutting ring 18. It should be appreciated that other combinations of the fluid channels 48a, 48b, 50a, 50b used to transport fluid within the front cutting ring 14 and the rear cutting ring 18 are within the scope of the invention.

The fluid channels 48a, 48b, 50a, 50b are in fluid communication with a fluid channel 32a formed in the hollow interior of the sleeve member 32, as shown in FIG. 9. As shown in FIG. 10, the fluid channel 50a of the trailing arm 36a transports fluid from the fluid channel 32a of the sleeve member 32 to one or more fluid openings 49 proximate the guide pad 42. In the illustrated embodiment, the trailing arm 36a has a plurality of fluid openings 49 in a predetermined pattern, such as a straight line. Alternatively, the trailing arm 36a can have a single, elongated opening 49 proximate the guide pad 42. It will be appreciated that the invention is not limited by the number, size and/or shape of the fluid opening 49, and that the invention can be practiced with one or more fluid openings 49 having any desirable size and shape, so long as sufficient fluid is provided to the guide pad/workpiece interface.

Similarly, the fluid channel 50b of the trailing arm 36b is used to transport fluid from the fluid channel 32a of the sleeve member 32 to one or more fluid openings 51 proximate the cutting insert 40. In the illustrated embodiment, only one fluid opening 51 is formed proximate the cutting insert 40. However, it will be appreciated that the invention is not limited by the number, size and/or shape of the fluid opening 51, and that the invention can be practiced with one or more fluid openings 51 having any desirable number, size and/or shape, so long as sufficient fluid is provided to the cutting insert/workpiece interface.

Figure 11:
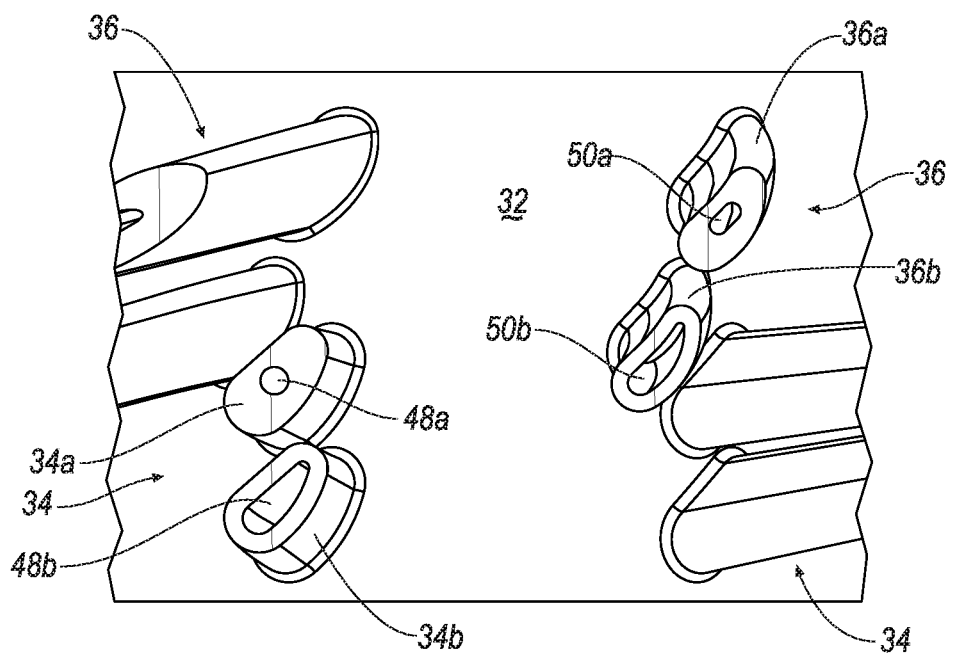
FIG. 11 is cross-sectional view of the upper and lower leading arms and the upper and lower trailing arms taken along line 11-11 of FIG. 8.
Figure 12:
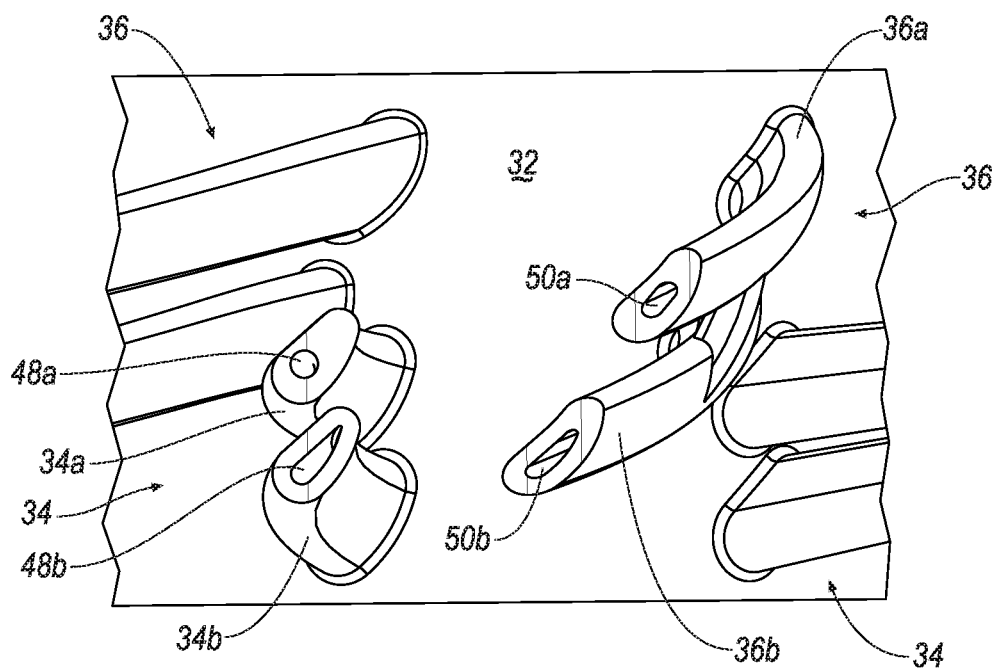
FIG. 12 is cross-sectional view of the upper and lower leading arms and the upper and lower trailing arms taken along line 12-12 of FIG. 8.

Referring now to FIGS. 11 and 12, the leading arms 34 and the trailing arms 36 have a non-circular cross-sectional shape. In the illustrated embodiment, the leading arms 34 and the trailing arms 36 are substantially kidney-shaped in cross section. Specifically, the cross-sectional area of each of the leading arms 34 and each of the trailing arms 36 is largest proximate the sleeve member 32 and is smallest proximate the cutting head 38 to help reduce the weight and the moment of inertia of the reamer 10. In addition, the cross-sectional area of the fluid channels 48a, 48b of the leading arms 34 and the cross-sectional area of the fluid channels 50a, 50b of the trailing arms 36 may vary along the length of the arms 34, 36.

Figure 13:
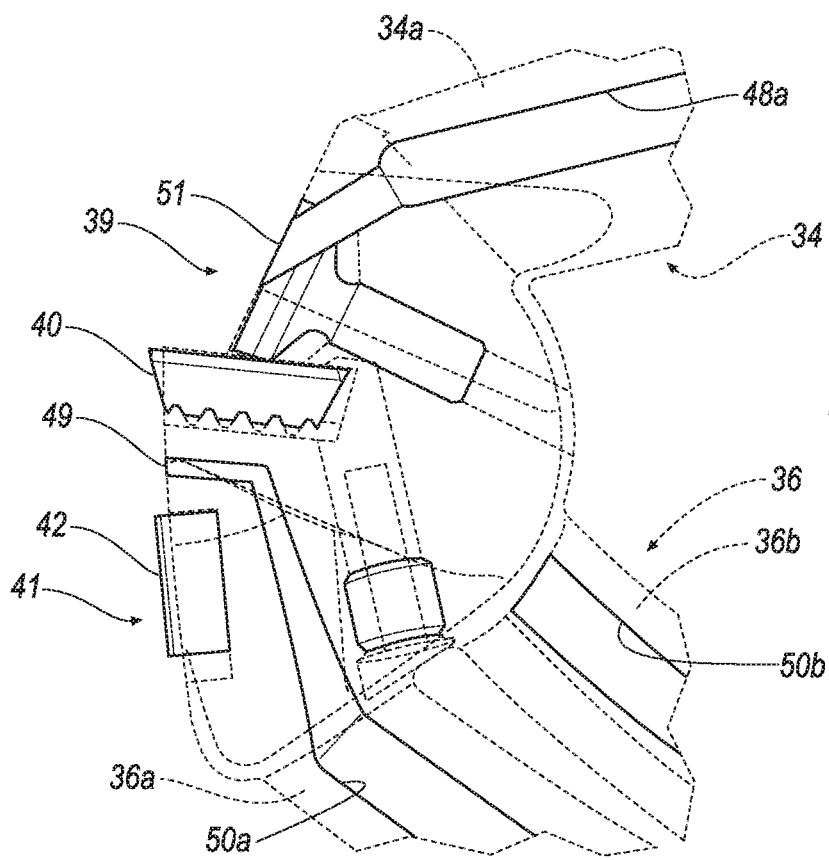
FIG. 13 is a partial, enlarged top view of the arm assembly of FIG. 9 showing fluid transported to the cutting insert/workpiece interface and the guide pad/workpiece interface by one leading arm and one trailing arm according to an embodiment of the invention.
Figure 14:
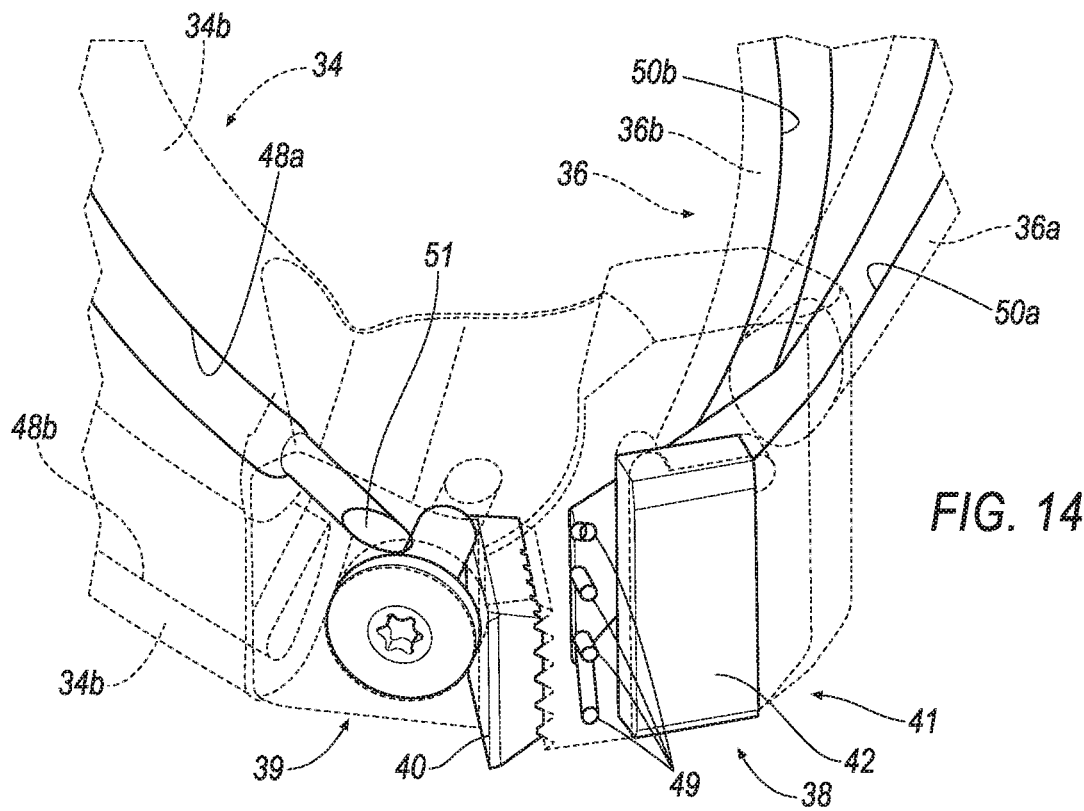
FIG. 14 is a partial, enlarged perspective view of the arm assembly of FIG. 9 showing fluid transported to the cutting insert/workpiece interface and the guide pad/workpiece interface by one leading arm and one trailing arm according to an embodiment of the invention.

In the illustrated embodiment shown in FIGS. 9 and 10, fluid from the sleeve member 32 is transported only through the trailing arms 36a, 36b to the cutting insert/workpiece interface and the guide pad/workpiece interface. However, it will be appreciated that any one of the fluid channels 48a, 48b, 50a, 50b can be used to transport fluid from the sleeve member 32 to the cutting insert/workpiece interface and the guide pad/workpiece interface. As shown in FIGS. 13 and 14, for example, the fluid channels 48a, 48b of one or both of the leading arms 34 can be used to transport fluid to the cutting insert/workpiece interface and the one or both of the trailing arms 36 can be used to transport fluid to the guide pad/workpiece interface.

Figure 15:
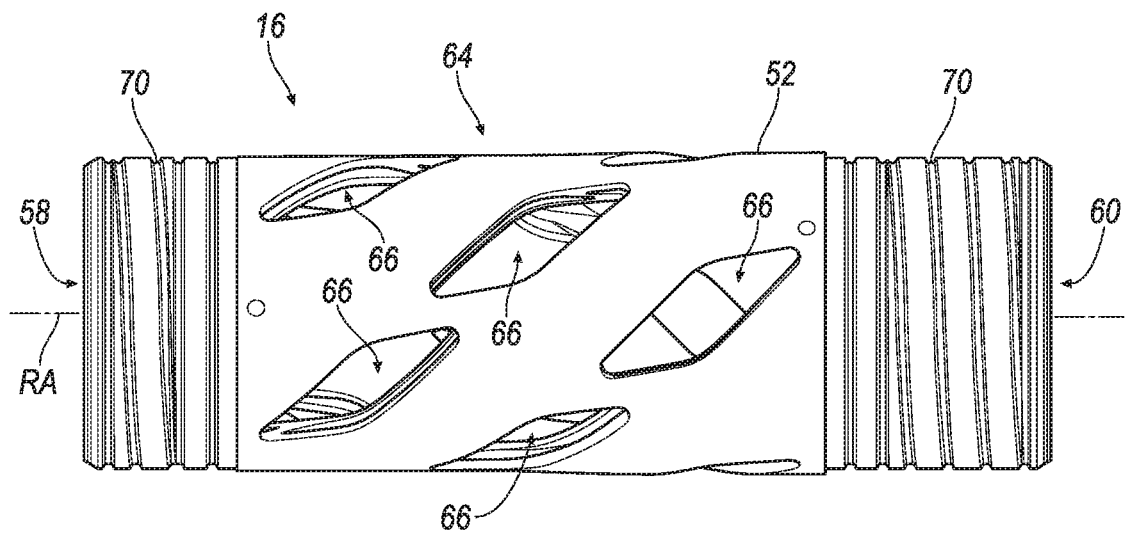
FIG. 15 is a side view of the center tube of the reamer according to an embodiment of the invention.
Figure 16:
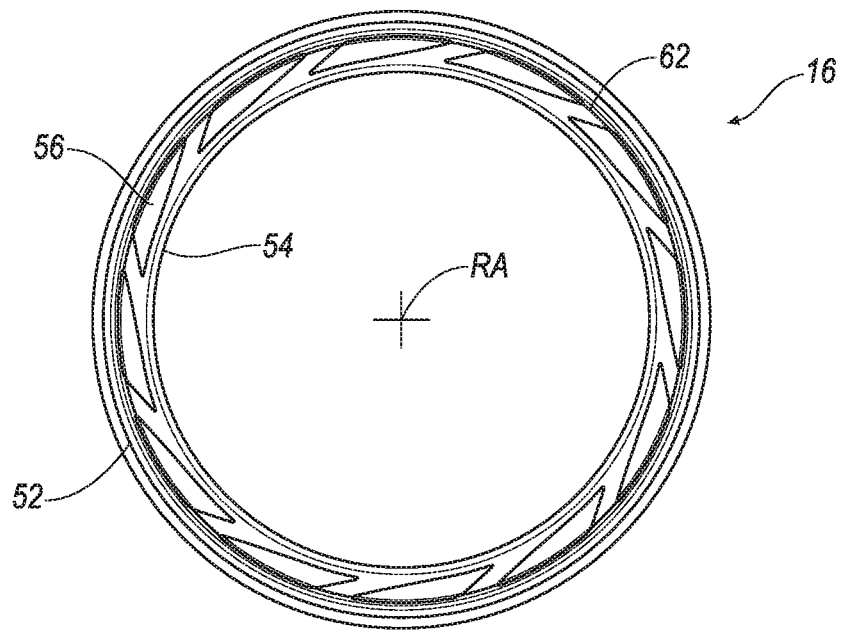
FIG. 16 is an end view of the center tube of FIG. 15 showing the cavity for transporting fluid through the center tube according to an embodiment of the invention.
Figure 17:
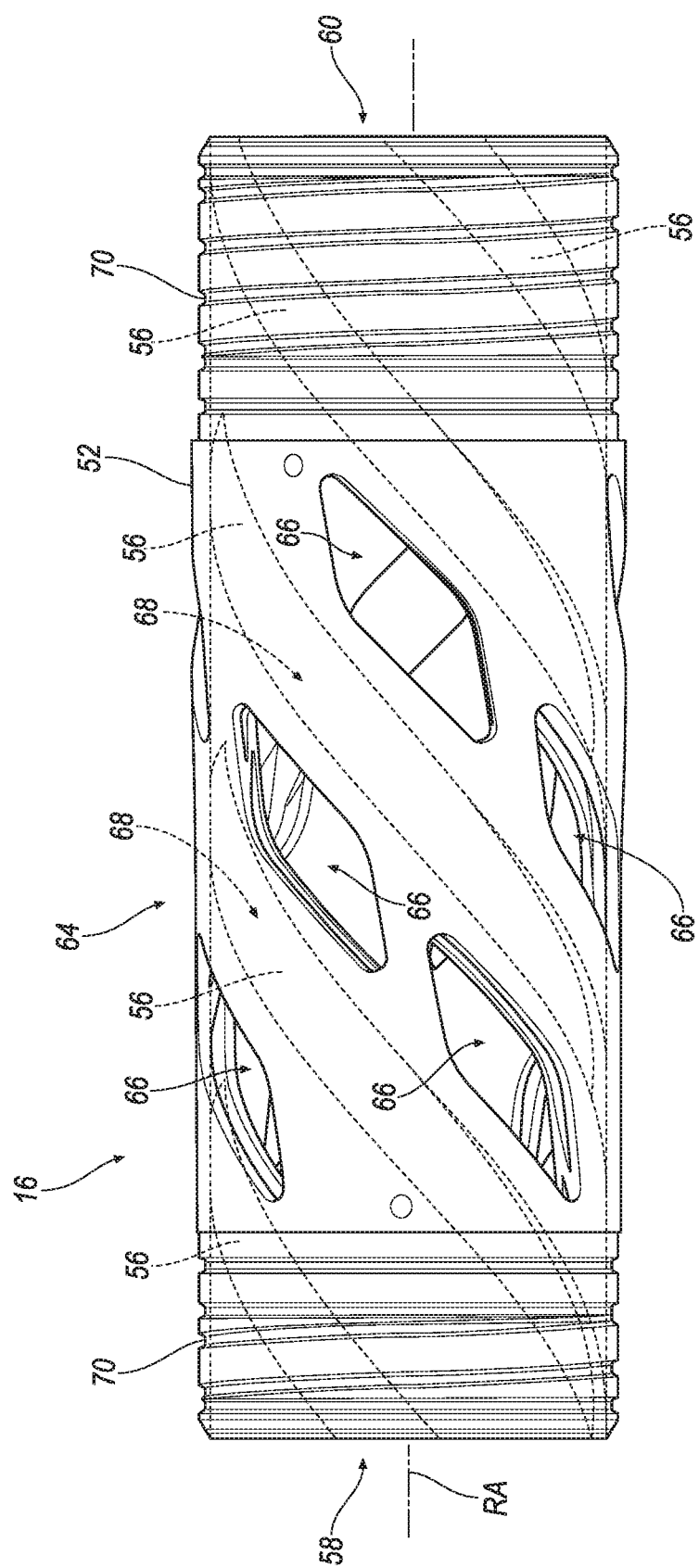
FIG. 17 is a side view of the center tube of FIG. 15 showing the fluid (in phantom) capable of being transported through the center tube.

Referring now to FIGS. 15-17, the center tube 16 has a double-walled construction comprising an outer wall 52 and an inner wall 54 forming a cavity 56 therebetween. The cavity 56 helps to further reduce the weight of the reamer 10. The center tube 16 has a first, front end 58 and a second, rear end 60. The first, front end 58 and the second, rear end 60 may have a diameter that is slightly less than the diameter of remainder of the center tube 16 to allow mounting of the front and rear cutting rings 14, 18. The center tube 16 may further include one or more ribs 62 extending between the outer wall 52 and the inner wall 54 to increase the rigidity of the center tube 16. In the illustrated embodiment, the center tube 16 has a total of twelve ribs 62 that follow a helical or spiral pattern to define a helical coolant channel 68 through the center tube 16, as shown in FIG. 17. However, it will be appreciated that the invention is not limited by the number of ribs 62, and that the invention can be practiced with any desirable number of ribs 62, so long as the center tube 16 has sufficient rigidity.

A central portion 64 of the center tube 16 may include one or more openings 66 disposed between the helical coolant channel 68 to help reduce the weight of the center tube 16. In the illustrated embodiment, the openings 66 are polygonal in shape, similar to a parallelogram. However, it will be appreciated that the invention is not limited by the shape of the openings 66, and that the invention can be practiced with openings having any desirable shape, such as circular, non-circular, and other polygonal shapes.

The cavity 56 and the helical coolant channel 68 enables the center tube 16 to transport pressurized fluid from the second, rear end 60 to the first, front end 58. Specifically, the fluid is transported by the helical coolant channel 68 within the cavity 56 between the first, front end 58 and the second, rear end 60, as shown in FIG. 17.

In the illustrated embodiment, the center tube 16 is made of steel and manufactured using additive manufacturing (i.e., 3D printing) to reduce the weight of the reamer 10. In an alternate embodiment, the center tube 16 can be made of any suitable material, such as carbon fiber, carbon fiber reinforced plastic (CFRP), and the like. In this alternate embodiment, the openings 66 can be omitted and the entire cavity 56 can be used to transport fluid throughout the center tube 16. In this alternate embodiment, the center tube 16 may be made using additive manufacturing (i.e., 3D printing) or any other suitable manufacturing process, such as sintering, plasma sputtering, and the like.

It is noted that the front cutting ring 14 is attached proximate the first, front end 58 of the center tube 16 and the rear cutting ring 18 is attached proximate the second, rear end 60 of the center tube 16 (FIGS. 1 and 2). In one embodiment, the front and rear cutting rings 14, 18 are glued to the center tube 16, and the center tube 16 includes grooves 70 at each end 58, 60 to facilitate the gluing process. The grooves 70 may be helical or spiral to further facilitate the gluing of the cutting rings 14, 18 to the center tube 16. Once properly attached to the center tube 16, each of the front cutting ring 14 and the rear cutting ring 16 are in fluid communication with the center tube 16. Specifically, the sleeve member 32 of each of the front cutting ring 14 and the rear cutting ring 16 is in fluid communication with the center tube 16.

The center tube 16 is connected to the rear machine connection member 20 (FIGS. 1 and 2). Once properly connected to the center tube 16, the rear machine connection member 20 is in fluid communication with the center tube 16. In turn, the rear machine connection member 20 can be coupled to a spindle assembly (not shown) for rotating the reamer 10 about the center, rotational axis, RA, and a fluid source (not shown) for providing pressurized fluid to the rear machine connection member 20.

Once the rear machine connection member 20 is in fluid communication with the fluid source, the fluid can be provided throughout the reamer 10 of the invention. Specifically, fluid entering the rear machine connection member 20 can travel into center tube 16 and then through the sleeve member 32 of the rear cutting ring 18, into the arm assemblies 44 and exit proximate the cutting insert 40 and the guide pad 42 of each arm assembly 44. In addition, fluid can travel past the rear cutting ring 18, partially through the center tube 16 and into the sleeve member 32 of the front cutting ring 14, into the arm assemblies 44 and exit proximate the cutting insert 40 and the guide pad 42 of each arm assembly 44. Further, fluid can travel through the front cutting ring 14 and into the front cutting body 12, and exit the ports 27, 29 (FIGS. 3 and 4) proximate each of the cutting inserts 40 and each of the guide pads 42, respectively.

As described above, the reamer 10 of the invention delivers fluid in an efficient manner to the interface between the cutting tool and the workpiece without significantly altering the performance and properties, such as torsional stiffness, and the like, of the reamer 10, as compared to conventional reamers.

The patents and publications referred to herein are hereby incorporated by reference.

Having described presently preferred embodiments the invention may be otherwise embodied within the scope of the appended claims.

What is claimed is:

1. A cutting tool, comprising: a rear machine connection member; a center tube having a front end and a rear end; at least one cutting ring secured to the center tube, the at least one cutting ring including a sleeve member and one or more arm assemblies, each arm assembly including one or more leading arms extending radially outwardly from the sleeve member, one or more trailing arms extending radially outwardly from the sleeve member, and a cutting head supported by the one or more leading arms and the one or more trailing arms, wherein a cross-sectional area of the one or more leading arms is largest proximate the sleeve member and is smallest proximate the cutting head to reduce weight and moment of inertia of the cutting tool, and wherein a cross-sectional area of the one or more trailing arms is largest proximate the sleeve member and is smallest proximate the cutting head to reduce weight and moment of inertia of the cutting tool.

2. The cutting tool of claim 1, further comprising a front cutting ring proximate the front end of the center tube, and a rear cutting ring proximate the rear end of the center tube.

3. The cutting tool of claim 1, wherein each of the one or more leading arms and the one or more trailing arms have a non-circular cross-sectional shape.

4. The cutting tool of claim 3, wherein each of the one or more leading arms and the one or more trailing arms have a kidney-shaped cross section.

5. The cutting tool of claim 1, wherein each of the one or more leading arms and each of the one or more trailing arms have a hollow interior portion defining a fluid channel capable of transporting fluid from the sleeve member to a cutting insert/workpiece interface.

6. The cutting tool of claim 5, wherein the fluid channel has a cross-sectional shape that varies along a length of each of the one or more leading arms and each of the one or more trailing arms.

7. The cutting tool of claim 1, wherein the one or more leading arms and the one or more trailing arms are formed with a helix angle, HA, with respect to a center, rotational axis, RA, of the cutting tool.

8. The cutting tool of claim 1, wherein the one or more leading arms extend radially outward from the sleeve member with a radius of curvature, $R_L$, and wherein the one or more trailing arms extend radially outward from the sleeve member with a radius of curvature, $R_T$.

9. The cutting tool of claim 8, wherein the trailing arms curve in the same direction as a direction of rotation, R, of the cutting tool, and the one or more leading arms curve in an opposite direction as a direction of rotation, R, of the cutting tool.

10. The cutting tool of claim 1, wherein the cutting head comprises an insert pocket for mounting a cutting insert therein.

11. The cutting tool of claim 1, wherein the cutting head comprises a guide pad pocket for mounting a guide pad therein.

12. The cutting tool of claim 1, wherein the center tube comprises an outer wall and an inner wall forming a cavity therebetween.

13. The cutting tool of claim 12, further comprising one or more ribs extending between the outer wall and the inner wall.

14. The cutting tool of claim 13, wherein the one or more ribs define a helical coolant channel within the cavity.

15. The cutting tool of claim 1, further comprising at least one support member for supporting one of the one or more leading arms and the one or more trailing arms.

16. The cutting tool of claim 1, wherein the cutting tool comprises a reamer.

17. A cutting tool, comprising: a rear machine connection member; a center tube having a front end and a rear end; at least one cutting ring secured to the center tube, the at least one cutting ring including a sleeve member and one or more arm assemblies, each arm assembly including one or more leading arms extending radially outwardly from the sleeve member, one or more trailing arms extending radially outwardly from the sleeve member, and a cutting head supported by the one or more leading arms and the one or more trailing arms, wherein the one or more leading arms extend radially outward from the sleeve member with a radius of curvature, RL, wherein the one or more trailing arms extend radially outward from the sleeve member with a radius of curvature, RT, and wherein the one or more leading arms curve in an opposite vertical and horizontal direction than the one or more trailing arms.

18. The cutting tool of claim 17, further comprising a front cutting ring proximate the front end of the center tube, and a rear cutting ring proximate the rear end of the center tube.

19. The cutting tool of claim 17, wherein a cross-sectional area of the one or more leading arms is largest proximate the sleeve member and is smallest proximate the cutting head to reduce weight and moment of inertia of the cutting tool, and wherein a cross-sectional area of the one or more trailing arms is largest proximate the sleeve member and is smallest proximate the cutting head to reduce weight and moment of inertia of the cutting tool.

20. The cutting tool of claim 17, wherein each of the one or more leading arms and the one or more trailing arms have a non-circular cross-sectional shape.

21. The cutting tool of claim 20, wherein each of the one or more leading arms and the one or more trailing arms have a kidney-shaped cross section.

22. The cutting tool of claim 17, wherein each of the one or more leading arms and each of the one or more trailing arms have a hollow interior portion defining a fluid channel capable of transporting fluid from the sleeve member to a cutting insert/workpiece interface.

23. The cutting tool of claim 22, wherein the fluid channel has a cross-sectional shape that varies along a length of each of the one or more leading arms and each of the one or more trailing arms.

24. The cutting tool of claim 17, wherein the cutting head comprises an insert pocket for mounting a cutting insert therein.

25. The cutting tool of claim 17, wherein the center tube comprises an outer wall and an inner wall forming a cavity therebetween.

26. The cutting tool of claim 25, further comprising one or more ribs extending between the outer wall and the inner wall.

27. The cutting tool of claim 26, wherein the one or more ribs are helical define a helical coolant channel within the cavity.

28. The cutting tool of claim 17, further comprising at least one support member for supporting one of the one or more leading arms and the one or more trailing arms.

29. The cutting tool of claim 17, wherein the cutting tool comprises a reamer.

* * * * *